United States Patent [19]

Küter et al.

[11] 4,029,981
[45] June 14, 1977

[54] ROTATING RECTIFIER ASSEMBLY FOR ELECTRIC MACHINES

[75] Inventors: Heinrich Küter, Wattenscheid; Erich Weghaupt, Mulheim (Ruhr), both of Germany

[73] Assignee: Kraftwerk Union Aktiengesellschaft, Germany

[22] Filed: July 10, 1975

[21] Appl. No.: 594,751

[30] Foreign Application Priority Data

July 11, 1974  Germany .......................... 2433464

[52] U.S. Cl. ............................................ 310/68 D
[51] Int. Cl.² ...................................... H02K 11/00
[58] Field of Search ............. 310/68, 68 D, 71, 72, 310/165, 64, 65; 317/100; 321/8; 318/242

[56] References Cited

UNITED STATES PATENTS

| | | | |
|---|---|---|---|
| 3,283,219 | 3/1973 | Spisak | 310/68 |
| 3,283,219 | 11/1966 | Keady | 310/68 |
| 3,363,122 | 1/1968 | Hoover | 310/68 |
| 3,371,235 | 2/1968 | Hoover | 310/68 |
| 3,590,291 | 6/1971 | Spisak | 310/68 D |
| 3,721,843 | 3/1973 | Spisak | 310/72 |
| 3,723,794 | 3/1973 | Spisak | 310/68 D |
| 3,852,628 | 12/1974 | Spisak | 310/68 D |
| 3,866,196 | 2/1975 | Mann | 310/68 D |
| 3,872,335 | 3/1975 | Petersen | 310/68 D |

*Primary Examiner*—R. Skudy
*Attorney, Agent, or Firm*—Herbert L. Lerner

[57] ABSTRACT

Rotating rectifier assembly in a multiphase bridge circuit for electric machines has active components including cooling members, rectifier cells and safety fuses and also includes a carrier wheel having a radially inner hub and a radially outer annular flange, the active components being radially outwardly braced at the inner side of the annular flange, the annular flange being formed of two parts, one of the parts being a radially inner flange ring connected to the hub and formed with openings for receiving therein and for securing the active components to the annular flange, and the other of the parts being a radially outer cap ring formed of very rigid material and being in press-fitting engagement with the flange ring.

3 Claims, 1 Drawing Figure

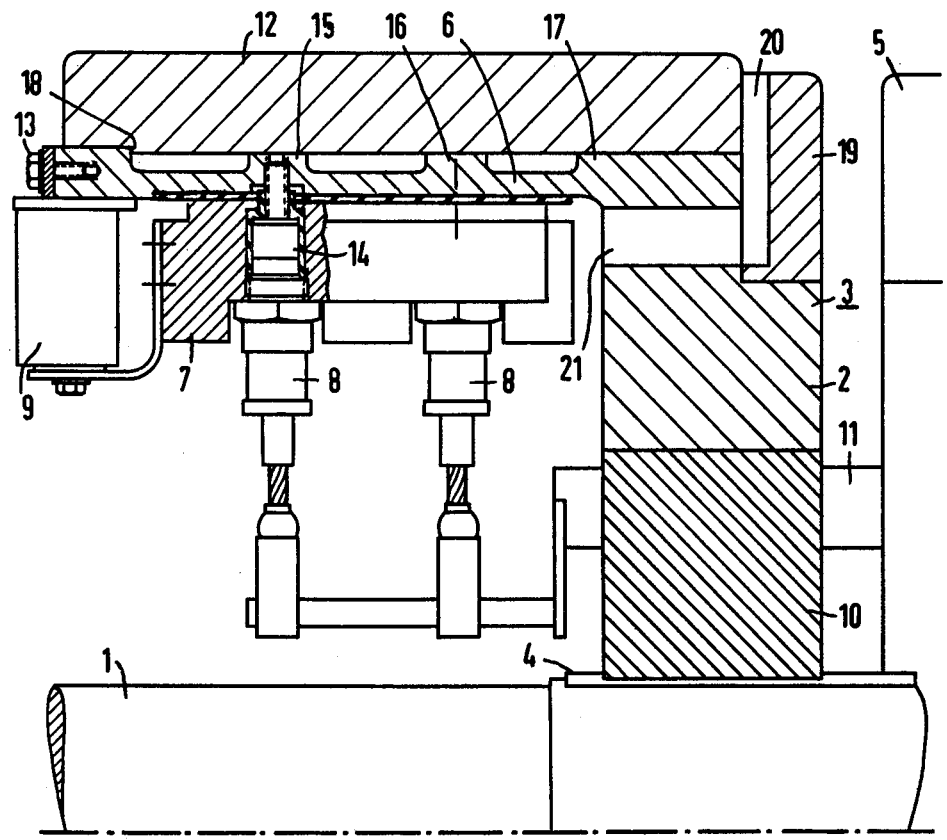

ROTATING RECTIFIER ASSEMBLY FOR ELECTRIC MACHINES

The invention relates to a rotating rectifier assembly in a multi-phase bridge circuit for electric machines wherein the assembly has active components, such as cooling members, rectifier cells and safety fuses, which are braced radially outwardly at the radially inner side of an annular flange of a carrier wheel.

An assembly of this general type has been disclosed heretofore in U.S. Pat. No. 3,371,235. In the assembly described in that patent, all of the active structural members or components, such as cooling members, rectifier cells, safety fuses and other circuit blocks or subassemblies are screwed directly into a ring or annular flange of a support or carrier wheel. With increasing outputs of exciter units, rectifier wheels must necessarily be provided that are of adequately large size to accommodate the resulting large number of active structural components, the control over the increasing size of the rectifier wheels with respect to the mechanical rigidity or strength thereof becoming increasingly more difficult. The limit of electrical outputs of an exciter wheel of conventional construction is accordingly provided no longer by the load capacity of the active structural components, but rather solely by the strength or rigidity of the annular or ring flange which carries them and braces them against centrifugal force. Furthermore, the heretofore known carrier or support wheels suffer from the disadvantage that the annular or ring flange is formed with fastening holes and retaining recesses for the active structural components so that it is impossible to make maximal use of the material of the ring flange as a result of notch stress peaks.

It is accordingly an object of the invention to provide a rotating rectifier assembly for electric machines, wherein carrier wheels of very large diameter are provided in accordance with the invention without permitting the centrifugal forces deriving from the structural members to be out of control.

With the foregoing and other objects in view, there is provided, in accordance with the invention, in a multi-phase bridge circuit for electric machines, a rotating rectifier assembly having active components including cooling members, rectifier cells and safety fuses, and comprising a carrier wheel having a radially inner hub and a radially outer annular flange, the active components being radially outwardly braced at the inner side of said annular flange, the annular flange being formed of two parts, one of the parts being a radially inner flange ring connected to the hub and formed with openings for receiving therein and for securing the active components to the annular flange, and the other of the parts being a radially outer cap ring formed of very rigid material and being in press-fitting engagement with the flange ring.

Through this bipartite subdivision of the annular flange and the shrink-fitting engagement of a cap ring that has a uniform cross section without holes or other notches formed therein, a material having such a great strength or rigidity as can be obtained only by cold forming or cold working can be used for the cap ring. Considerably greater centrifugal forces can thereby be absorbed.

Other features which are considered as characteristic for the invention are set forth in the appended claims.

Although the invention is illustrated and described herein as embodied in rotating rectifier assembly for electric machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the accompanying drawing which is a half-sectional view of a rotating rectifier assembly having a carrier wheel in accordance with the invention.

Referring now to the drawing, there is shown in longitudinal sectional view, a carrier wheel 3 having a hub 2 by which it is press-fittingly mounted on a shaft 1 of an exciter machine or of a generator, a layer of electrical insulation 4 and an intermediate ring 10 of nonmagnetic material, through which multiphase current leads 11 extend, being disposed therebetween. In the FIGURE, only one pole or one carrier wheel 3 of the rectifier assembly is shown in sectional view. The other pole or other carrier wheel 5 of the rectifier assembly is of similar construction as that of the one carrier wheel 3 but is, however, a mirror-image thereof and is disposed back-to-back with the one carrier wheel 3, as represented in the FIGURE. A flange ring 6 of unitary or one-piece construction with the hub 2, is provided, furthermore, at the outer periphery of the carrier wheel 3 and carries all of the active structural members or components of the rotating rectifier assembly of the invention, such as cooling member 7, rectifier cells 8 and safety fuses 9.

In accordance with the invention, the flange ring 6 serves not only for absorbing the centrifugal forces produced by the active structural members or components, but also the annular flange of the carrier wheel 3 is of bipartite construction, in that a cap ring 12 of very strong or rigid material, such as a steel having a yield strength greater than 90 to 100 kp/mm$^2$ (kilopond per square millimeter), for example, is press-fitted on the radially inwardly disposed flange ring 6. The cap ring 12 has a uniform cross-sectional area over the entire periphery thereof, and no variations in cross-section, such as screw holes or other recesses, for example, are formed therein which could result in the formation of notch stresses. As is readily apparent from the FIGURE of the drawing, the fuses 9 and the cooling members 7 are threadedly secured by screws 13 and 14, respectively, solely to the radially inwardly disposed flange ring 6, which thus is the only part formed with fastening holes and receivers for the active structural members or components. The inner flange ring 6 is formed as thin as possible. The shrink or press-fitting connection of the inner flange ring 6 with the outer cap ring 12 is effected through several circular cross-pieces 15, 16 and 17 that are disposed adjacent one another in axial direction. The shrink or press-fitting tolerances are of such dimension at each cross-piece 15, 16, 17 that optimal stressing by centrifugal force occurs both at standstill or shutdown as well as during operation. The cap ring 12 is accordingly secured at one end thereof by a stop 18 at the flange ring 6 and, at the other end thereof, by a closure or locking ring 19 mounted in a recess formed in the hub 2. The closure ring 19 is formed with additional radially extending channels 20 which communicate with axially extending openings or passages 21 formed in the carrier wheel hub 2 and thereby serve to discharge cooling air from the rectifiers 8 and the cooling members 7.

Since the cap ring 12 has no bores or recesses formed therein but is rather provided with a uniform wall thickness, it can therefore be formed of a material having such high strength or rigidity as can be attained only through cold-forming or working. The cap ring 12 stressed only in tension during all operating conditions, and absorbs all centrifugal forces of the active structural members or components and the flange ring 6. Since the cap ring 12 has considerably greater strength or rigidity than the flange ring extending from the hub and used heretofore conventionally by itself, the cap ring 12 can absorb considerably higher stresses so that thereby, rectifier wheels of larger diameter can be produced safely in proportion with the increasing outputs of the exciter units.

We claim:

1. In a multiphase bridge circuit for electric machines, a rotating rectifier assembly having active components including cooling members, rectifier cells and safety fuses, and comprising a carrier wheel having a radially inner hub and a radially outer annular flange connected to said radially inner hub, the active components being radially outwardly braced at the inner side of said annular flange, said annular flange being formed of two parts, one of said parts being a radially inner flange ring of unitary construction with said hub, said radially inner flange ring formed with openings and solely containing all the openings for receiving therein and for securing the active components to said annular flange, and the other of said parts being radially outer cap ring without bores or recesses formed therein and of very strong material and being in press-fitting engagement with said flange ring, said cap ring and having uniform cross-sectional area over its axial length.

2. Rotating rectifier assembly according to claim 1 wherein said cap ring is formed with a stop at one axial end thereof and has a fastening ring seated on said hub at the other axial end of said cap ring for securing said cap ring against axial displacement.

3. Rotating rectifier assembly according to claim 1 wherein said flange ring is formed with a plurality of mutually adjacent circular cross-pieces at the outer periphery thereof, said cross-pieces having press-fit surfaces press-fittingly engaged by said cap ring.

* * * * *